J. T. DAVIS.
APPARATUS FOR FRACTIONAL DISTILLATION.
APPLICATION FILED SEPT. 12, 1916.
1,218,840.
Patented Mar. 13, 1917.
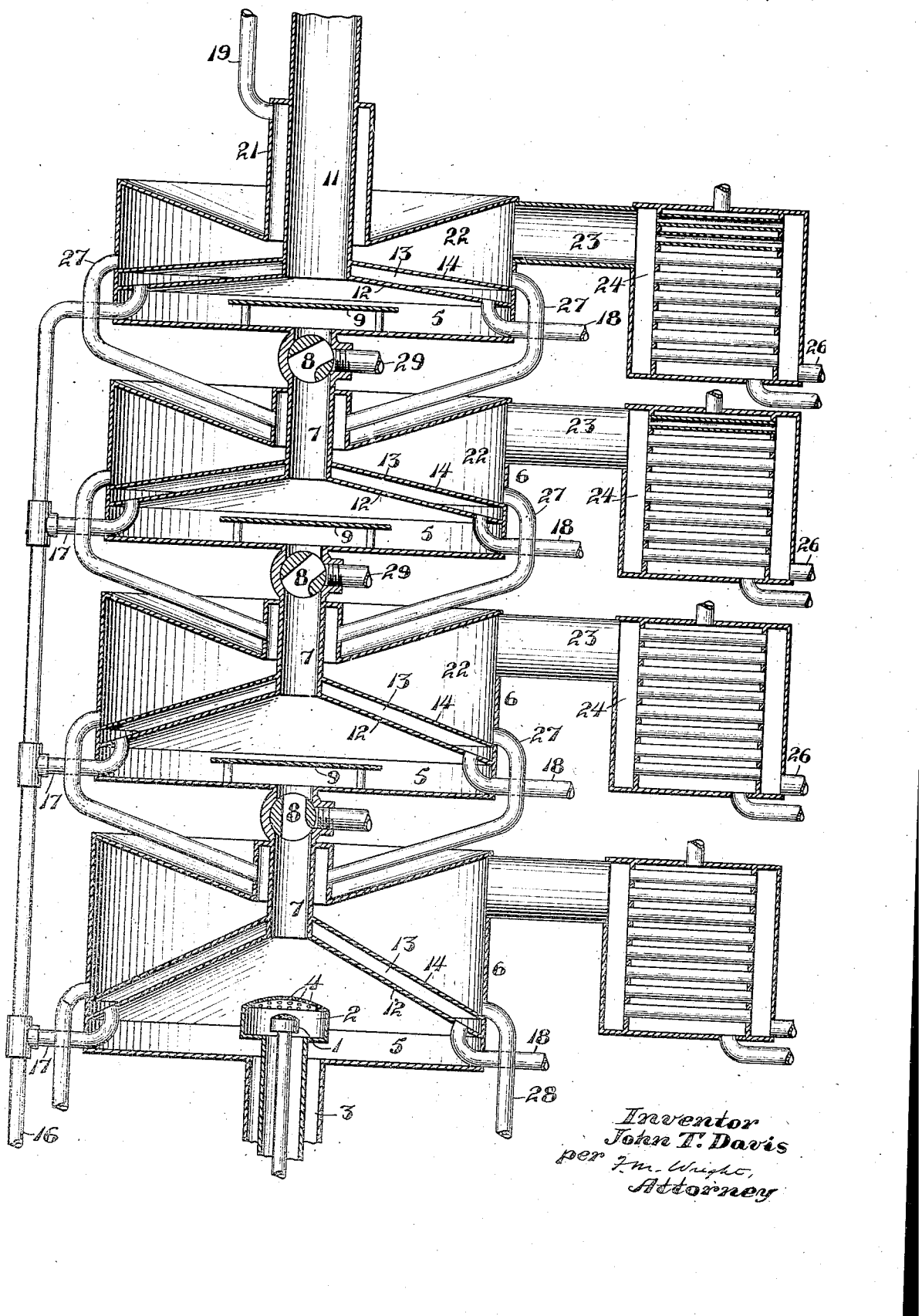
Inventor
John T. Davis
per J. M. Wright,
Attorney

UNITED STATES PATENT OFFICE.

JOHN T. DAVIS, OF ALAMEDA, CALIFORNIA, ASSIGNOR OF FIFTY-ONE ONE-HUNDREDTHS TO LOUIS LEVY AND JOSEPH ROTHSCHILD, BOTH OF SAN FRANCISCO, CALIFORNIA.

APPARATUS FOR FRACTIONAL DISTILLATION.

1,218,840.

Specification of Letters Patent.

Patented Mar. 13, 1917.

Application filed September 12, 1916. Serial No. 119,647.

*To all whom it may concern:*

Be it known that I, JOHN T. DAVIS, a citizen of the United States, residing at Alameda, in the county of Alameda and State of California, have invented new and useful Improvements in Apparatus for Fractional Distillation, of which the following is a specification.

The object of the present invention is to provide a simple, economical and efficient apparatus for fractionally distilling oil.

In the accompanying drawing, the figure is a vertical section of my improved fractional distillation apparatus, certain parts being shown in side elevation.

Referring to the drawing, 1 indicates a fluid fuel burner contained within a distributing chamber 2, supplied with air by a pipe 3, and from which the products of combustion of the fuel are discharged through holes 4 in a convex upper side of the chamber 2. Said products of combustion are discharged in an incandescent condition from said chamber into the lowermost heating chamber 5 of the lowermost of a vertical series of vaporizers 6, then through a central flue 7 in said vaporizer, and leading therefrom and through a valve 8 therein, into the lowermost heating chamber 5 of the next higher vaporizer, impinging against an abutment plate 9 therein and being caused to be spread in said heating chamber, and so on, in like manner through each vaporizer 6 in succession, finally passing out through a stack 11 leading from the uppermost vaporizer.

Each heating chamber 5 is separated from the remainder of the vaporizer 6 by a conical top 12, the flue 7-leading from the apex of said cone, said conical top 12 forming also the bottom of a steam chamber 13 having a conical top 14. Steam is led into each of said conical steam chambers 13 from a main steam supply pipe 16 and individual pipes 17, and can be drawn off by individual pipes 18 from said conical chambers. The oil to be distilled is supplied by one or more pipes 19 into a cylindrical extension 21 of the uppermost chamber 22 of the uppermost vaporizer 6, which extension surrounds the stack 11, and the oil flows down in said extension on to the central portion of the conical plate 14, which forms the bottom of said uppermost chamber, then flowing in a thin film over said plate 14 to the outer cylindrical edge of said chamber 22, during which time the most volatile portions of the oil are vaporized, the vapor escaping from said chamber 22 by a conduit 23 leading to a condenser 24, and the distillate discharging from said condenser by a pipe 26. The oil which is not thus vaporized flows by a pipe 27 into the cylindrical extension 21 of the next lower vaporizing chamber 22, flowing down upon the top of the steam chamber in like manner as before, the more volatile portions thereof escaping through the conduit 23 into the condenser 24. The residuum of the oil then proceeds in like manner as before through the several chambers 22, until the whole of the volatile portion of the oil is vaporized and condensed, the lowermost outlet pipe 28 leading to a suitable receptacle for said residuum.

The valves 8 in the several flues control the passage of the hot gases from one heating chamber to another, and communicating with the valve casings are conduits 29 by which part of the hot gases may be drawn off at the several stages in their ascent.

The steam in the steam chambers is superheated by the products of combustion from the burner 1, that in the lowermost steam chamber being most highly superheated, and the degree to which the chambers are superheated diminishing gradually according to their elevation.

The degree of slope of the surface down which the oil runs is made to increase downwardly in the series of surfaces, because of the tendency of the oil to run more slowly as the vapors are withdrawn therefrom, and as it consequently thickens.

I claim:—

1. The combination of a downwardly extending series of vaporizers, each comprising a vaporizing chamber at the top, a heating chamber at the bottom, and a steam chamber interposed between the heating chamber and the vaporizing chamber, conduits leading from the lower portions of the vaporizing chambers to the upper portions of those below them, means for supplying the steam chambers with steam, flues connecting the upper portions of the heating chambers with the lower portions of those above them, means for supplying the lowermost heating chamber with hot gases and for drawing off hot gases from the uppermost heating chamber, conduits leading from the several vaporizing chambers, and condensers into which said conduits lead.

2. The combination of a downwardly extending series of vaporizers, each comprising a vaporizing chamber at the top, a heating chamber at the bottom, and a steam chamber having a conical top and interposed between the heating chamber and the vaporizing chamber, conduits leading from the lower portions of the vaporizing chambers to the upper portions of those below them, means for supplying the steam chambers with steam, flues connecting the upper portions of the heating chambers with the lower portions of those above them, means for supplying the lowermost heating chamber with hot gases and for drawing off hot gases from the uppermost heating chamber, conduits leading from the several vaporizing chambers, and condensers into which said conduits lead.

3. The combination of a downwardly extending series of vaporizers, each comprising a vaporizing chamber at the top, a heating chamber at the bottom, and a steam chamber having a conical top of slope increasing gradually downward and interposed between the heating chamber and the vaporizing chamber, conduits leading from the lower portions of the vaporizing chambers to the upper portions of those below them, means for supplying the steam chambers with steam, flues connecting the upper portions of the heating chambers with the lower portions of those above them, means for supplying the lowermost heating chamber with hot gases and for drawing off hot gases from the uppermost heating chamber, conduits leading from the several vaporizing chambers, and condensers into which said conduits lead.

4. The combination of a downwardly extending series of vaporizers, each comprising a vaporizing chamber at the top, a heating chamber at the bottom, and a steam chamber interposed between the heating chamber and the vaporizing chamber, conduits leading from the lower portions of the vaporizing chambers to the upper portions of those below them, means for supplying the steam chambers with steam, flues connecting the upper portions of the heating chambers with the lower portions of those above them, means for supplying the lowermost heating chamber with hot gases and for drawing off hot gases from the uppermost heating chamber, baffle plates in the heating chambers against which the hot gases discharge upwardly, conduits leading from the several vaporizing chambers, and condensers into which said conduits lead.

5. The combination of a downwardly extending series of vaporizers, each comprising a vaporizing chamber at the top, a heating chamber at the bottom, and a steam chamber interposed between the heating chamber and the vaporizing chamber, conduits leading from the lower portions of the vaporizing chambers to the upper portions of those below them, means for supplying the steam chambers with steam, flues connecting the upper portions of the heating chambers with the lower portions of those above them, valves in the several flues, escape conduits communicating with the valve casings, means for supplying the lowermost heating chamber with hot gases and for drawing off hot gases from the uppermost heating chamber, conduits leading from the several vaporizing chambers, and condensers into which said conduits lead.

JOHN T. DAVIS.